Aug. 18, 1953     R. K. WITT ET AL     2,649,396

METHOD OF PRODUCING A BONDED STRUCTURE

Filed March 17, 1949

GLASS FABRIC

LOWER ALKYL ALKOXY SILANE

GLASS FABRIC

THERMOSETTING RESIN-IMPREGNATED FABRIC

LOWER ALKYL ALKOXY SILANE

GLASS FABRIC

GLASS FIBRES- PRETREATED WITH SILANE AND IMBEDDED IN THERMOSETTING RESIN

INVENTORS
RALPH K. WITT, WILLIAM G. CARSON AND
BETTY LOU RASKIN    BY

ATTORNEYS

Patented Aug. 18, 1953

2,649,396

UNITED STATES PATENT OFFICE 2,649,396

METHOD OF PRODUCING A BONDED STRUCTURE

Ralph K. Witt, William G. Carson, and Betty Lou Raskin, Baltimore, Md.

Application March 17, 1949, Serial No. 82,008

3 Claims. (Cl. 154—128)

This invention relates to bonded structures and methods of producing them. More particularly, the present invention relates to structures having as a component thereof, glass in the form of liquid, fibers, pieces or sheets.

In some of its more detailed aspects the invention is directed to the problem of bonding glass to glass, glass to metal or glass to a non-metal other than glass, such as synthetic plastics, wood, bone, etc. The invention includes within its scope, for example, the bonding of glass in the form of woven glass textiles, textiles reinforced with glass fibers, felted glass fibers, glass matte and even sheets of glass to any of the aforementioned metals or non-metals in the presence of plastics such as thermosetting synthetic resins, examples of which are melamine, phenolic, silicone, polyester, and similar resins.

Attempts have been made heretofore to produce strong laminated, felted or matted structures of good dielectric properties including glass fibers embedded in a plastic material. Such structures have been found to be lacking the strength and durability which might be expected, apparently due to lack of a firm bond between the glass fibers themselves and between the glass fibers and the plastic.

The present invention, to some extent at least, overcomes the deficiencies of the structures of the prior art by producing a bonded structure of exceptionally high tensile and flexural strength and resistance to impact as well as being durable and of excellent dielectric properties. The production of the novel bonded structures of the present invention is made possible by effecting the bonding operation in the presence of a silane derivative.

A large number of silane derivatives are suitable for the purposes of the present invention. Among those found to be highly satisfactory are the alkyl substituted silanes such as the alkyl alkoxy silanes. It is found that in the foregoing compounds, the organic group preferably is an unsaturated alkyl alkoxy radical. The following compounds are representative of those falling within the scope of the present invention:

A. Unsaturated alkoxy or aryloxy silanes
  1. Different chain lengths in unsaturated groups. Monovinyl triethoxy silane, monoallyl triethoxy silane.
  2. Different chain lengths in alkoxy or aryloxy silane. Monoallyl trimethoxy silane, monoallyl triphenoxy silane.
  3. Variations in relative number of unsaturated groups to alkoxy or aryloxy groups. Triallyl monoethoxy silane, monoallyl monoethoxy silane.
B. Saturated alkoxy or aryloxy silanes
  1. Different chain lengths in saturated groups. Monopropyl triethoxy silane, monomethyl triethoxy silane.
  2. Different chain lengths in alkoxy or aryloxy groups. Monopropyl trimethoxy silane, monopropyl tributoxy silane.

The alkyl substituted silanes of the present invention are designated for purposes of simplification by the type formula:

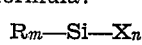

$$R_m\text{—Si—}X_n$$

wherein R is an alkyl group selected from the group of vinyl and allyl, X is an alkoxy group or halogen and $m$ and $n$ each have a value of 1, 2 or 3, but $m$ plus $n$ equals 4.

The bonding may be effected under a wide range of pressures. Temperature used will be determined by use or nonuse of a catalyst, by the nature of the resin and by the time desired to be allowed for polymerization of the resin.

It is an object of the present invention, therefore, to provide a bonded structure of exceptionally high mechanical strength, etc., having glass in significant proportion as a component thereof, the bond of said structure having been produced in the presence of an alkyl substituted silane.

It is a further object of the invention to bond glass to a metal or a non-metal in the presence of an alkyl substituted silane.

It is a further object of the invention to produce a bonded structure containing glass and a plastic material such as the well-known thermosetting synthetic resins generally used in industry, the glass and the plastic material being brought together in the presence of an alkyl substituted silane.

It is a further object to form bonded structures with glass and plastic material in the presence of an alkyl substituted silane by use of pressure to produce a product of exceptional tensile and flexural strength, dielectric properties, resistance to impact and general durability.

It will be understood that one or more of the alkyl silanes of the present invention preferably is incorporated in the product, for example, by treating the glass therewith while the glass is in the form of a sheet of woven textile, a felted mass, a matte or as a reinforcement for other fibrous material and the alkyl silane may be applied to the glass by immersion, coating, spraying or exposure of the glass to the vapors of a volatile alkyl silane.

A preferred procedure is as follows:

Glass cloth that has been previously heat cleaned at high temperatures to remove any surface contaminants such as sizing is available in roll form and is desirable for use. The glass cloth is run through a bath containing a solution of the silane treating compound of the present invention in a suitable volatile solvent. Excess pick-up of solution can be reduced by running the cloth through squeeze rolls after it leaves the bath. The cloth is then dried as by running it over a bank of infra-red lamps or through an oven. If desired, the solvent may be recovered from the exhaust from the oven. The cloth can then be run directly to the thermosetting resin coating solution or rerolled.

The treated cloth is run through the resin bath and then through squeeze rolls adjusted for proper resin pick-up. The coated cloth is then dried by passing it through an oven. Solvent evaporation and partial polymerization of the resin occur during this stage. The dried coated cloth is rerolled and later cut to proper size for the lay-up of the laminate prior to pressing.

The coated glass cloth is cut to proper size and placed in position in the lay-up. If a phenolic resin is used, the lay-up is now ready for pressing. When a polyester resin is used, the catalyzed resin is poured over each piece of surface treated glass cloth as the cloth is put in position and spread around with a blade. After the desired number of layers of cloth are put in position the lay-up is ready for pressing.

For a flat sheet a press with heated platens is used. For phenolic resins a pressure of about 1,000 p. s. i. and a curing temperature of 300° F. for 45 minutes is normally found to be adequate. For low pressure resins pressures of 1 p. s. i. or greater and a temperature of about 225° F. for one hour are suitable. For laminates that are not flat the lay-up can be pressed against a suitable contour form by inflating a suitably shaped rubber bag so that it will press the lay-up against the form.

The drying of the material after application of the silane, the precoating of the glass and preliminary partial polymerization of the resin and the times mentioned for curing are preferential only.

The quantity of resin liquid present when pressure is applied should be at least sufficient to fill the voids of the compressed material and preferably to provide a slight excess. Assuming that the glass is in the form of a sheet of felted glass fibers one-half inch thick and a pressure is to be applied sufficient to reduce the thickness of the sheet to one-fourth inch, the resin liquid when applied would be in volume somewhat greater than the volume of the voids initially present in the sheet.

For purposes of illustration, the foregoing steps are illustrated in the accompanying drawings, wherein Fig. 1 is a cross-section of a sheet of glass fabric;

Figure 1:
Figure 2:
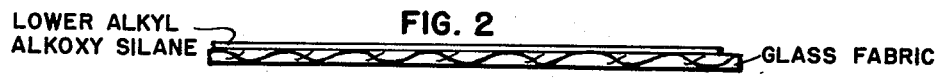
Fig. 2 is a cross-section of the sheet of glass fabric shown in Fig. 1 after treatment of the fibers thereof with a lower alkyl alkoxy silane.
Figure 3:
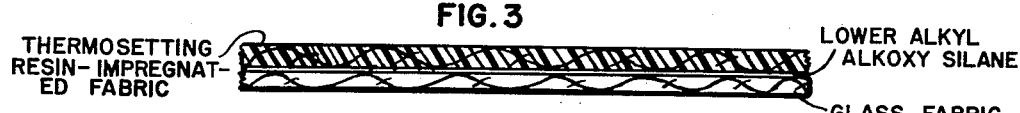
Fig. 3 is a cross-section of the glass fabric treated as indicated in Fig. 2 but having applied thereto a thermosetting resin-impregnated fabric as described hereinbefore.
Figure 4:
Fig. 4 is a cross-section of a matte of glass fibers pretreated with a lower alkyl alkoxy silane and imbedded in a thermosetting resin.

The mechanism by which the unexpected results of the present invention are obtained is not thoroughly understood. However, it is believed that the silanes of the present invention modify the interface between the glass fibers and the material to which the fibers are to be bonded, whether such material is a metal, non-metal or even glass itself. The invention is not limited to or dependent upon this theory of operation but is limited only by the patentable scope of the appended claims.

The material of the present invention is capable of wide use in the arts. It is valuable for use in the electrical art because of high dielectric resistance, tensile strength and resistance to impact. It is usable to replace steel and other metals for many purposes. It may be used as a construction material for boats, furniture, automobile bodies, machinery frames, buildings, fishing rods, conduits, plumbing and many other structures.

In the production of structures made up of portions of differing thickness it is feasible to lay up portions of one thickness in layers, to impregnate, press and polymerize those portions, leaving untreated portions of certain layers projecting, and to later combine such untreated portions of layers with the later laid up layers of the portion, or portions, of different thickness, followed by polymerization of said later portions, to provide an, in effect, integral structure.

We claim:

1. The method of producing a bonded structure composed substantially of glass fibers and a thermosetting resin selected from the group consisting of melamine, phenolic, silicone and polyester resins which comprises applying to the glass fibers free of sizing an unsaturated lower alkyl alkoxy silane selected from the group consisting of vinyl alkoxy silanes and allyl alkoxy silanes; removing excess silane from said glass fibers; applying to the glass fibers thus treated a thermosetting resin selected from the group consisting of melamine, phenolic, silicone and polyester resins; applying the resin coated glass fibers to a surface to be bonded thereto; and curing the resin whereby the bonded structure is produced.

2. The method as set forth in claim 1 wherein the selected silane is an allyl alkoxy silane.

3. The method set forth in claim 1 wherein the selected silane is a vinyl alkoxy silane.

RALPH K. WITT.
WILLIAM G. CARSON.
BETTY LOU RASKIN.

References Cited in the file of this patent

UNITED STATES PATENTS

| Number | Name | Date |
|---|---|---|
| 2,258,218 | Rochow | Oct. 7, 1941 |
| 2,392,805 | Biefeld | Jan. 15, 1946 |
| 2,426,121 | Rust | Aug. 19, 1947 |
| 2,438,736 | Barry | Mar. 30, 1948 |
| 2,441,066 | Hanford | May 4, 1948 |
| 2,442,613 | Nicodemus | June 1, 1948 |
| 2,460,795 | Warrick | Feb. 1, 1949 |

OTHER REFERENCES

Modern Plastics, "Silicone Resin Bonded Laminates," March 1946, pp. 160–162.